April 15, 1941.    E. J. COOK    2,238,717
CONTROL SYSTEM FOR REPRODUCING MACHINES
Filed March 13, 1939    4 Sheets-Sheet 2

INVENTOR.
Everett J. Cook
BY
ATTORNEYS

April 15, 1941.  E. J. COOK  2,238,717
CONTROL SYSTEM FOR REPRODUCING MACHINES
Filed March 13, 1939  4 Sheets-Sheet 3

INVENTOR.
Everett J. Cook
BY
ATTORNEYS

April 15, 1941. E. J. COOK 2,238,717
CONTROL SYSTEM FOR REPRODUCING MACHINES
Filed March 13, 1939 4 Sheets-Sheet 4

Fig. 4.

INVENTOR.
Everett J. Cook
BY
ATTORNEYS

Patented Apr. 15, 1941

2,238,717

UNITED STATES PATENT OFFICE 2,238,717

CONTROL SYSTEM FOR REPRODUCING MACHINES

Everett J. Cook, Toledo, Ohio, assignor to H. H. Buggie & Company, Toledo, Ohio, a corporation of Ohio Application March 13, 1939, Serial No. 261,606

18 Claims. (Cl. 90—13.5)

This invention relates generally to control systems for machines and refers more particularly to an improved system for controlling reproducing apparatus wherein a record is reproduced in a work blank by relatively moving the latter and a tool toward and away from each other by mechanism controlled by a light sensitive cell which, in turn, is controlled by variations in shading of the record.

It is one of the principal objects of this invention to provide the reproducing machine with a safety device in the form of means responsive to a predetermined change in the value of the current flowing through the light sensitive cell to oppose the action of the latter and effect relative movement of the tool and work in a direction opposite the direction influenced by the light sensitive cell.

In reproducing machines of the photoelectric cell controlled type, it is customary to scan the shaded record with an optical unit including a light sensitive cell responsive to variations in the intensity of light intercepted by the cell to pass an electrical current which increases and decreases as the light intensity increases and decreases. In many installations of this general type, the tool is operated, either directly or indirectly by an electromagnet having a load coil connected to the light sensitive cell through an amplifier of a design to increase the current through the light sensitive cell sufficiently to energize the load coil and move the tool in a direction away from the work when the intensity of light intercepted by the cell increases. On the other hand, when the intensity of the light intercepted by the light sensitive cell decreases, a drop in current results in the output circuit of the amplifier and the tool is moved in a direction toward the work.

In accordance with this invention, the components of the amplifier circuit are balanced so that the wattage through the load coil will increase or decrease as the intensity of light intercepted by the light sensitive cell increases or decreases. It follows, therefore, that when the light sensitive cell intercepts a shaded portion of the record, the tool is fed into the work by suitable means to an extent depending upon the resulting drop in current in the output circuit of the amplifier or, in other words, in dependence upon the degree of darkness of the shaded portion and, if the shade of this portion is darker than the shade required to produce the desired depth of cut, the tool will drill or cut too deeply into the work. To this end, the present invention contemplates a relatively simple safety device operating automatically to withdraw the tool from the work in the event a shade on the record, darker than the desired shade, is intercepted by the photoelectric cell.

As indicated above, the value of the electric current flowing through the amplifier circuit increases and decreases as the light intensity intercepted by the light sensitive cell increases and decreases. The present invention contemplates taking advantage of this characteristic by providing means responsive to fluctuations in the flow of current through the amplifier circuit and effective when the current drops below the value required to produce the predetermined depth of cut of the tool to energize the load coil of the electromagnet and withdraw the tool from the work.

A further feature of this invention resides in the provision of a safety device of the character set forth above having a photoelectric cell responsive to the operation of an ammeter in the amplifier circuit at the output side of the light sensitive cell scanning the record, to withdraw the tool from the work when the current drops below the desired predetermined value.

Still another object of this invention consists in providing a reproducing equipment wherein the record, as well as the surface of the pattern carrying the record, is reproduced by a tool controlled by a light sensitive cell in accordance with variations in the shading of the record and in dependence upon changes in the contour of the surface of the pattern carrying the record.

In addition to the foregoing, the present invention contemplates means for automatically discontinuing the operation of the apparatus in the event of failure of the record illuminating means. This feature, as well as the foregoing and other objects, will be made more apparent as this description proceeds, especially when considered in connection with the accompanying drawings, wherein:

For the purpose of illustrating the present invention, I have selected a machine for fashioning a mold cavity in a work blank to the exact size and shape of the article it is desired to cast, although it will be understood as this description proceeds that the principles involved herein are not limited to this specific application of the invention. As a matter of fact, my improved control system is applicable to any combination where the movement of a work fashioning tool relative to a work blank is controlled by an optical unit including a light sensitive cell scanning a pattern and responsive to changes in contour of the pattern, as well as variations in shading of any record that may be applied to the pattern.

Inasmuch as the machine shown herein is solely for the purpose of illustrating one typical application of the electrical control system forming the subject matter of this invention, it is not believed necessary to describe the same in detail. Briefly described, it will be noted from Figure 1 that the machine comprises a work support 10 and a pattern support 11 mounted in side by side relationship on a traversing carriage 12 for oscillation by mechanism not shown herein, but which may be the same as illustrated in my Patent No. 2,154,974, dated April 18, 1939. A pattern A having a shaded record A' is mounted on the support 11 for oscillation therewith as a unit and a work blank B is secured to the support 10 for movement with the latter. The pattern corresponds exactly in shape and size to the article it is desired to cast in the mold cavity to be formed in the work blank B and is preferably formed of, or coated with a good light reflecting material. The shaded record A', on the other hand, may be a photograph, sketch or print of the decoration or printing it is desired to apply to the article to be cast from the completed mold.

Figure 1:
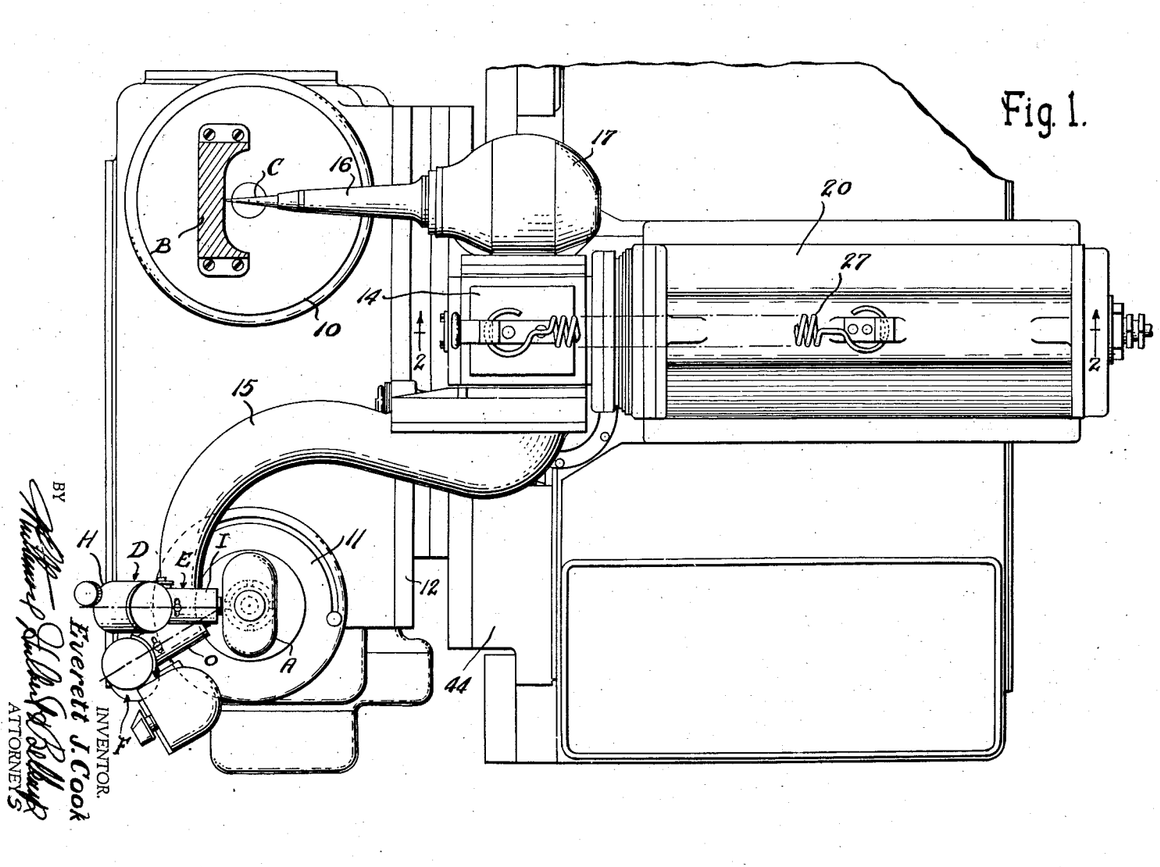
Figure 1 is a top plan view of a portion of a reproducing machine controlled in accordance with the teachings in this invention.

In the present instance, the outer half of the surface of the pattern A is scanned by an optical unit D and the latter controls the movements of a tool C positioned at the inner side of the work blank B opposite the latter. Both the tool C and optical unit D are mounted on the forward end of a ram 14 supported for reciprocation toward and away from the traversing carriage 12. The optical unit D is positioned opposite the pattern A at the outer side of the latter on an arm 15 having the inner end secured to the forward end of the ram so that movement of the ram in a direction toward the carriage 12 effects a corresponding movement of the optical unit D away from the pattern A. The tool C, on the other hand, is mounted on a spindle 16 driven by an electric motor 17 secured directly to the ram so that movement of the latter toward the carriage 12 effects a movement of the tool C toward the work blank B. In other words, the arrangement is such that the tool C is fed into the work by the ram 14 when the optical unit D is moved by the ram away from the pattern A.

Figure 2:
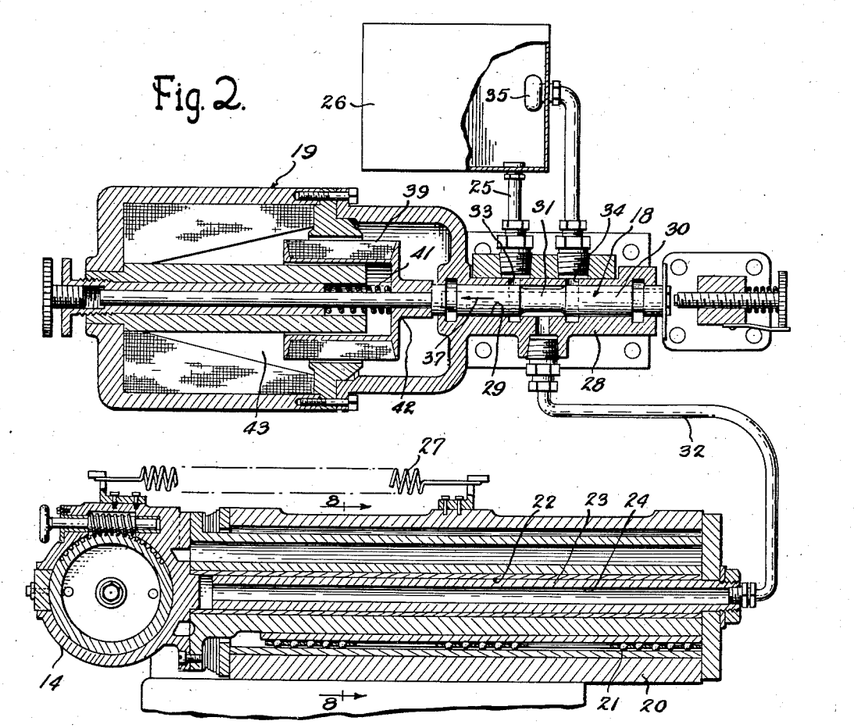
Figure 2 is a sectional view taken substantially on the plane indicated by the line 2—2 of Figure 1 and illustrating the tool operating mechanism.
Figure 8:
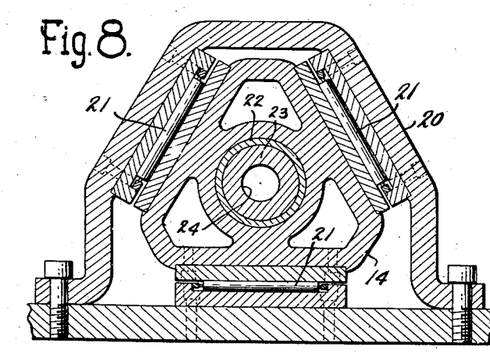
Figure 8 is a sectional view taken substantially on the plane indicated by the line 8—8 of Figure 2.

Upon reference to Figure 2, it will be noted that the ram 14 is operated by fluid pressure in dependence upon the operation of a valve 18 controlled by an electromagnet 19. The particular construction of the ram illustrated herein is the same in construction as the one shown in my Patent No. 2,176,666, dated October 17, 1939, and forms no part of this invention. Briefly described, the ram is triangular in cross section and slides in a casing 20 corresponding to the ram in cross section, as shown in Figure 8. A set of needle bearings 21 is supported between the opposed parallel walls of the ram 14 and casing 20 to reduce friction to a minimum. In addition, the ram is provided with a cylinder 22 slidably receiving a piston 23, which is fixedly secured to the frame of the machine against movement and is axially bored to provide the passage 24 therethrough. The rear end of the bore or passage 24 alternately communicates with a source of fluid under pressure 25 and a fluid supply tank 26 through the valve 18. The inner end of the cylinder 22 is closed by and is secured to the head of the ram so that fluid under pressure supplied to the cylinder 22 through the passage 24 in the piston 23 effects a movement of the head together with the cylinder in a direction toward the traversing carriage 12. On the other hand, when the pressure in the passage 24 is exhausted by the valve 18, the ram is moved in the opposite direction by a suitable spring 27.

The valve 18 comprises a casing 28 having a bore 29 therethrough for slidably receiving a valve plunger 30. The valve plunger 30 is formed with a reduced portion 31 intermediate the ends thereof arranged in constant communication with the rear end of the passage 24 through the piston 23 by a conduit 32 and respectively establishes communication between the bore or passage 24 and ports 33 and 34 as the plunger 30 moves in opposite directions from the neutral position shown in Figure 2. The port 34 communicates with the discharge side of a suitable pump 35 located within a fluid supply tank 36 and the port 33 communicates with the tank 36. The arrangement is such that movement of the plunger 30 in the direction of the arrow 37 from the position shown in Figure 2 establishes communication between the passage 24 and the port 33 communicating with the supply tank 36. As a result, fluid pressure is exhausted from the ram and the latter is moved in a direction away from the traversing carriage 12 or, in other words, the tool C is withdrawn from the work and the optical unit D is moved toward the pattern A. Of course, movement of the valve plunger 30 in a direction opposite the direction of the arrow 37 establishes communication between the passage 24, through the piston 23, and the port 34 communicating with the pump 35. As a result, fluid under pressure is built up in the passage 24 and the ram is moved by fluid pressure against the action of the spring 27 in a direction to feed the tool C into the work B and to move the optical unit away from the pattern A.

In the illustrated embodiment of the invention, the valve plunger 30 is moved in a direction to withdraw the tool from the work by energizing a load coil 39 of the electromagnet 19 and is moved in the opposite direction to effect feeding of the tool into the work by a spring 41 acting on the armature 42 of the electromagnet to resist movement of the load coil 39 into the magnetic field 43.

Figures 3, 5, 6, 7:
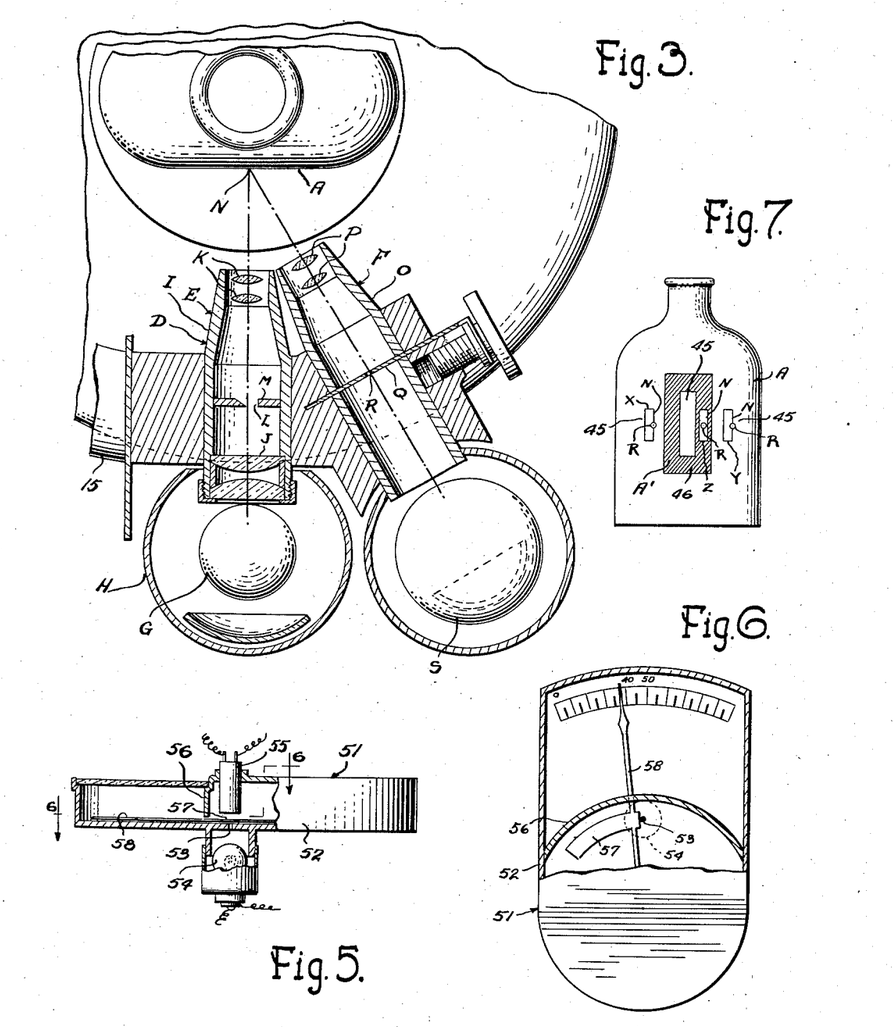
Figure 3 is a semi-diagrammatic sectional plan view of the optical unit employed to scan the pattern.
Figure 5 is a side elevational view, partly in section, of a safety device employed in the control system.
Figure 6 is a sectional view taken substantially on the plane indicated by the line 6—6 of Figure 5.
Figure 7 is an elevational view of the pattern employed in the present embodiment of the invention.

The operation of the electromagnet is controlled by the optical unit D in accordance with changes in shape of the surface of the pattern scanned and in dependence upon variations in shading of the record A' on the pattern A. The optical unit D comprises a light projector E and a light sensitive cell device F supported on the arm 15 in fixed angular relation to the projector. The light projector E has a source of illumination G housed by a casing H and registering with the outer end of a lens barrel I having condenser lenses J secured in the outer end thereof and having objective lenses K secured in the inner end of the same. A plate or diaphragm M is located between the two lenses and is formed with a slot L therethrough of a shape predetermined to cast an illuminated image on the surface of the pattern A having a sharply defined contour line N.

The photoelectric cell device F is also provided with a lens barrel O having its axis in a common horizontal plane with the axis of the projector lens barrel I and having objective lenses P fixed in the inner end thereof. The axis of the lens barrel O converges toward the axis of the projector lens barrel I and intersects the latter axis at a point spaced inwardly beyond the inner ends of the lens barrels for reasons to be more fully hereinafter set forth. In addition, the photoelectric cell device F is provided with a light sensitive cell in the form of a phototube S supported in a suitable light tight casing joined with the outer end of the lens barrel O to receive light passing through the latter. In this connection, it will be noted from Figure 3 that a plate Q is secured in the lens barrel O between the lenses P and the light sensitive cell S. This plate Q is provided with a restricted aperture R therethrough located substantially on the axis of the lens barrel O and may be properly termed the line of sight of the phototube S since the latter is affected only by the light escaping through the aperture R.

It has previously been stated that the axis of the projector lens barrel I and the axis of the phototube lens barrel O are arranged in fixed angular relationship. The angle between these two axes is so determined that when the tool is properly set with reference to the work blank B, the axes of the lens barrels intersect at the surface of the pattern A or, in other words, the aperture R straddles the contour line N of the image reflected from the pattern on the plate Q.

The entire surface of the pattern A to be reproduced in the work blank B is, of course, scanned by the optical unit D and exactly the same area of the work blank is necessarily traversed by the tool C. As stated above, the pattern support and work support are mounted on the traversing carriage 12. This carriage is movable back and forth by mechanism, not shown herein, and is also fed vertically by a carriage 44, generally shown in Figure 1. The carriage 44 is raised by a step by step movement and the means for accomplishing this result is not shown herein, but may be similar to the means provided for this purpose in my copending application Serial No. 120,134, filed: January 11, 1937. Reference has also been made to the fact that the work blank B and pattern A are oscillated about their vertical axes. This is particularly desirable in cases where the sides of the article to be formed are on a radius in that it renders it possible to maintain the tool substantially normal to the surface being cut.

With the above in mind and remembering that the angle between the light beam and line of sight of the light sensitive cell remains constant throughout the traversing operation, it follows that as the surface of the pattern A approaches the optical unit D, the image reflected on the plate Q is shifted relative to the aperture R in a direction to diminish the intensity of light passing through the aperture R to the light sensitive cell S. Such action has the effect of reducing the current flowing through the load coil 39 of the electromagnet 19 to such an extent that the spring 41 operates the valve 18 to supply fluid pressure to the passage 24 in the ram 14 and effect movement of the ram 14 in a direction to feed the tool C into the work. It will, of course, be understood that movement of the tool C in the above direction causes a corresponding movement of the optical unit D away from the pattern and this movement continues until the aperture R intercepts the illuminated portion of the image. As the intensity of light passing through the aperture R is increased by interception of the aperture R with the illuminated portion of the image, the quantity of current flowing through the load coil of the electromagnet 19 is correspondingly increased and becomes sufficient to counteract the spring 41 and operate the valve 18 to permit movement of the ram 14 in a direction to withdraw the tool C from the work by the spring 27. As a result, the aperture R is maintained in straddling relationship with the contour line N and, since this contour line represents a section of the pattern as viewed from the light sensitive cell S, it follows that an exact replica of the surface of the pattern scanned is produced in the work blank B.

Having described the manner in which the shape of the surface of the pattern scanned is exactly reproduced in the work blank B, reference will now be made to the manner in which variations in shade of the record A' affect the tool. Assuming, for the purpose of illustration, that the record is in the form of the sketch, shown in Figure 7, as having light and dark portions 45 and 46, it will be noted that when the dark or shaded portions 46 of the sketch are scanned by the light sensitive cell S, the light intensity intercepted by the cell is diminished sufficiently to effect the drop in current flowing through the cell required to permit the spring 41 to operate the valve 18 and effect movement of the ram 14 by the action of fluid pressure in a direction to cause the tool to feed into the work. On the other hand, when the light portions 45 of the sketch are scanned by the cell S, the intensity of light intercepted by the photocell S is increased sufficiently to effect the increase in current flow through the cell S required to counteract the spring 41 and operate the valve 18 to permit movement of the ram 14 by the spring 27 in a direction to withdraw the tool from the work. The arrangement is such that the decoration represented by the sketch is cut into the mold while the latter is shaped to the contour of the pattern.

In order to better illustrate the manner in which the tool is controlled by both the contour of the surface of the pattern A and variations in shading of the record A', attention is directed to Figure 7, wherein three positions of the light image cast by the projector on the surface of the pattern are shown with reference to the aperture R of the light sensitive cell S. In the two positions X and Y, the tool is controlled in accordance with the contour of the pattern in the manner set forth above and in the position Z the tool is controlled in accordance with variations in the shading of the record A'. Assuming that the light image and aperture R are in the position Z, it will be noted that the intensity of light escaping through the aperture R onto the cell S is reduced by the shaded portion of the record and, as a result, the current passing through the photocell S is correspondingly reduced. This reduction in current admits fluid under pressure into the passage 24 in the ram to feed the tool into the work to an extent depending upon the degree of shade of the record, or upon the drop in current flow through the cell S, and correspondingly moves the optical unit D away from the pattern so that the aperture R registers with the portion of the image which is ordinarily brightly illuminated. Accordingly, as soon as the image and aperture R reach the position Y, the intensity of light passing through the aperture R onto the photocell S increases and causes the optical unit D to move toward the pattern A and the tool to move in a direction away from the work B until the aperture R again straddles the contour line N of the image.

The depth of cut of the decoration in the mold by the tool depends upon the strength of the current passing through the electromagnet 19, which in turn depends upon the depth of the dark portions 46 of the sketch. As a matter of fact, it has been found that if the shaded or dark portions of the sketch are too deep in color, practically no current will pass through the phototube or electromagnet 19, and the tool will drill the work under the influence of the fluid pressure acting on the ram. It follows, therefore, that a shade slightly darker than the shade required to produce the maximum depth of cut in the work, will cause the tool to drill the work. While it is a fairly simple matter to discover the proper shade to produce the maximum depth of cut in the work, nevertheless, it is practically impossible in practice to produce a sketch with a dark portion having the proper uniform depth of shade. This is particularly true in cases where it is desired to cut as deeply as possible without drilling the work as the difference in the shade which will cause the tool to drill is hardly distinguishable from the shade required to effect the maximum depth of cut without drilling.

The present invention contemplates the provision of means for automatically withdrawing the tool from the work in the event the shade of any part of the dark portion 46 of the sketch is darker than the shade required to produce the desired depth of cut. As stated above, the amount of current passing through the phototube S increases and decreases as the intensity of light impinged on the light sensitive plate of the tube S increases and decreases. It follows, therefore, that a drop in current will result in the control circuit to be presently described, if the optical system scans a part of the shaded portion 46 of the sketch A' which is darker than the shade desired to produce the predetermined depth of cut. In accordance with this invention, the current flowing through the control circuit is measured by a microammeter and the latter operates in dependence upon a drop in current below the quantity induced by the proper shade to effect energization of the electromagnet 19 and withdraw the tool from the work.

Figure 4:
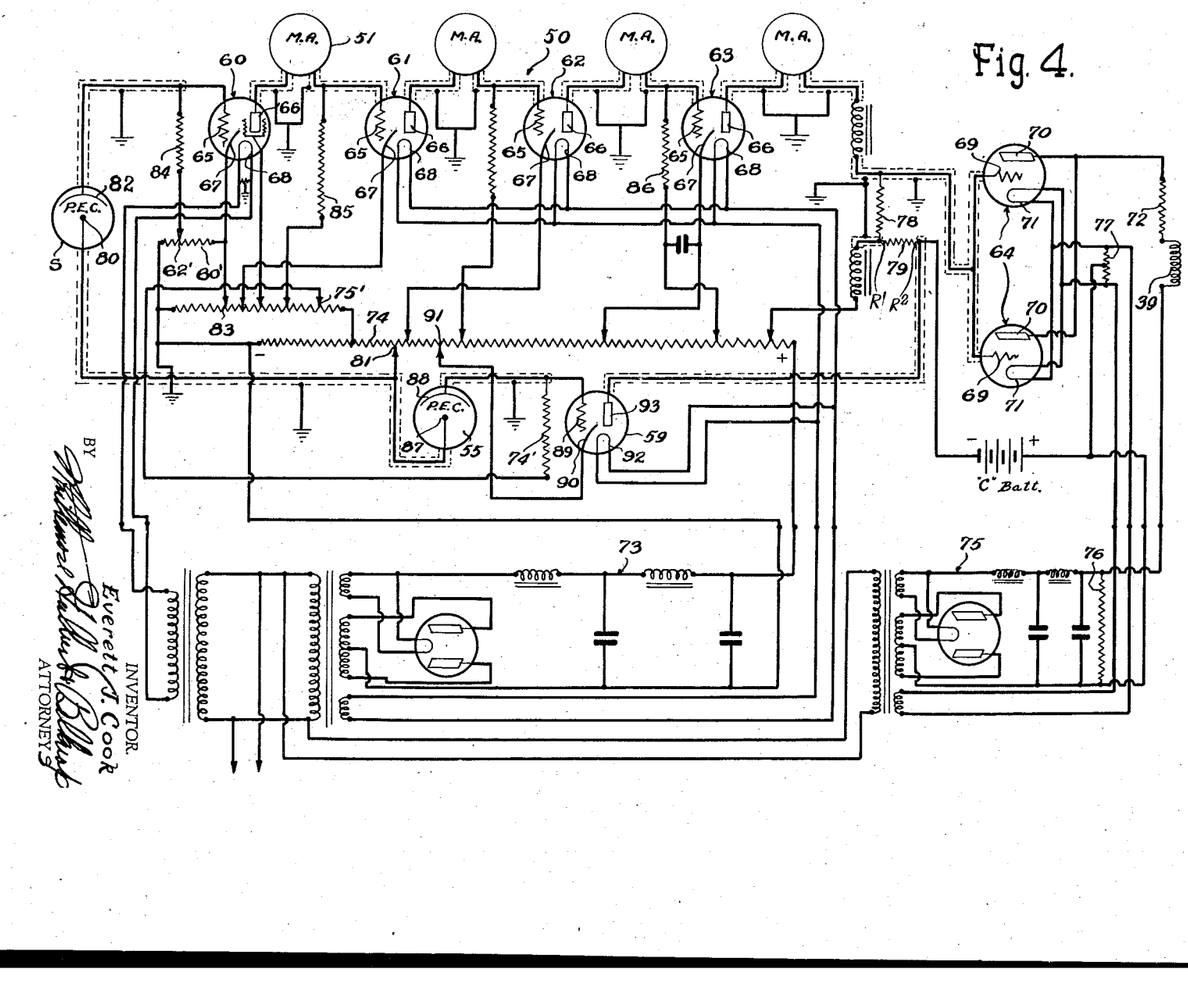
Figure 4 is an electrical diagram of the control system.

The control circuit diagram is shown in Figure 4 and it will be noted that the phototube S is connected to the load coil 39 of the electromagnet 19 by an amplifier 50 of the direct current amplification type having a microammeter 51 in the first stage to indicate the amount of current passing through the light sensitive cell or phototube S. The principle of operation of the microammeter 51 to indicate the current passing through the phototube S is the same as any of the well known designs available to the trade and, accordingly, the present description will be limited to the modifications of this meter required in order that the same may perform the additional function of effecting energization of the load coil 39 to withdraw the tool from the work in the event the current drops below a predetermined value. Upon reference to Figures 5 and 6, it will be noted that the casing 52 of the microammeter is provided with an opening 53 therethrough forming a light passage between a source of illumination in the form of a lamp 54 and a light sensitive cell 55 supported on opposite sides of the microammeter. As shown in Figure 5, the light sensitive cell 55 is mounted in a light tight box 56 opposite the face of the microammeter and light is normally blocked from the cell 55 by a vane or valve member 57 carried by the indicating needle 58 of the ammeter.

The vane 57 is of sufficient length to block the passage 53 during movement of the indicator needle 58 throughout the range of normal operation of the circuit which, for the purpose of illustration, will be considered as 40 to 50 microamperes. In other words, it will be considered that any drop in current below 40 microamperes will effect feeding of the tool too deeply into the work. The arrangement is such that when the current drops below 40 microamperes, the indicator needle 58 moves to a position wherein the vane 57 uncovers the light passage 53 and permits light from the bulb 54 to impinge on the light sensitive cell 55. The resulting current flowing through the light sensitive cell 55 is amplified by an auxiliary amplifier 59 connected with the last stage of the amplifier 50 in a manner to counteract the grid bias of the tubes in the last stage to energize the load coil 39 of the electromagnet and effect withdrawal of the tool from the work. It may be pointed out at this time that the above described safety arrangement does not effect the normal operation of the tool under the influence of variations in contour of the pattern. This is due to the fact that the surface of the pattern is of a lighter shade than the shaded portion 46 of the record A' and the drop in current in the control circuit effected when the aperture R intercepts the shadow at one side of the contour line is not sufficient to operate the microammeter 51 to the extent required to allow light from the lamp 54 to pass through the aperture 53 onto the photocell S.

With the foregoing in mind, reference will now be made more in detail to the control circuit shown by the diagram in Figure 4 of the drawings. As will be observed from this diagram, the amplifier 50 comprises a plurality of amplifier tubes, designated generally by the reference characters 60, 61, 62, 63 and 64. Each of the amplifier tubes 60, 61, 62 and 63 comprises a grid 65, a plate 66, a cathode 67, and a heating element 68 in the form of a filament. The amplifier tubes 64 in the last stage of the amplifier are connected together in parallel so that the output is greater than any one of the preceding tubes. In the embodiment of the invention shown in Figure 4, each of the tubes 64 comprises a grid 69, a plate 70, and a filament 71 which also acts as the cathode element of the tube.

The output or plate circuit of each preceding tube is conductively coupled to the grid of the succeeding tube and the plate or output circuits of the two parallel tubes 64 are connected to the load coil 39 of the electromagnet 19 through a resistor 72. It will be noted from Figure 4 that a power pack 73 of conventional design provides a low voltage alternating current for the filaments 68 of the amplifier tubes 60, 61, 62 and 63. In addition, the power pack 73 embodies a rectifier of the full-wave type which supplies a high voltage direct current across a resistor 74 and the latter, in turn, supplies the proper voltages to the plate circuits of the tubes 60, 61, 62 and 63.

Similar elements of the tubes 64 are connected together to provide multiple operation and a second rectifier 75 supplies the plate circuit of these tubes. The plate circuit of the tubes 64 comprises a resistor 76, the load coil 39 of the electromagnet 19, the resistor 72, the two plates 70, the filaments 71, and a resistor 77. Beginning at the center tap of the resistor 77, the grid circuit of the tubes 64 includes the C battery, with the polarity indicated, and resistors 78 and 79 conductively connecting the grids 69 in the plate circuit of the tube 63.

It will be noted from Figure 4 that the phototube or light sensitive cell S is electrically connected in parallel in the grid circuit of the amplifier tube 60. The anode 80 of the phototube is electrically connected to the resistor 74 at the tap 81 and the cathode 82 is electrically connected to the grid 65 of the tube 60. The grid circuit of the tube 60, starting from the cathode 67, includes a resistance 60', a resistance 84, and also the portion of the resistor 74 between the negative end of the latter and the tap 83 connecting the resistor 74 to the cathode 67. By tracing the grid circuit of the tube 60 through the resistance 84 to the tap 62' on the resistor 60', it will be noted that the grid 65 of the tube 60 is at a negative potential with respect to the cathode or plate circuit of this tube when the phototube S is dark or, in other words, when no current is flowing through the tube S.

However, when the intensity of light intercepted by the phototube S becomes sufficient to cause a current of predetermined value to flow through the phototube S, a voltage drop is effected across the resistor 84 connected in parallel in the grid circuit of the tube 60. This voltage drop is positive with respect to the cathode 67 of the tube 60 and has a counteractive effect on the fixed grid bias of this tube tending to make the grid less negative. When this condition exists, current flows through the plate circuit of the tube 60 and the flow of this current through a resistor 85 in the grid circuit of the second tube 61 causes a voltage drop across this resistor sufficient to render the normally positive grid of the tube 61 less positive. The cessation of current flow in the plate circuit of the second tube 61 causes the voltage on the normally positive grid of the third tube 62 to increase to substantially the voltage at the tap 81. In other words, the grid of the tube 62 becomes more positive and causes a flow of current through the plate circuit of this tube. As current flows through the plate circuit of the tube 62, a voltage drop results across the resistor 86 rendering the normally positive grid of the tube 63 less positive and effecting a reduction in the flow of current through the plate circuit of the tube 63. A drop in current in the plate circuit of the tube 63 reduces the counteractive effect on the "C" battery and effects an increase in voltage on the grids 69 of the tubes 64, with the result that current flows through the plate circuit of these tubes. Inasmuch as the load coil 39 of the electromagnet is connected in the plate circuit of the tubes 64, it will be noted that the current flowing through the load coil will be correspondingly increased to operate the valve 18 and effect withdrawal of the tool from the work.

When the intensity of light, intercepted by the phototube S, is decreased sufficiently to cause a predetermined drop in current flowing through the phototube, it will be understood that the grid potential of the tube 60 is reduced and, accordingly, the grid potential of the tubes 64 is correspondingly reduced. The resulting drop in current in the output or plate circuit of the tubes 64 reduces the flow of current through the load coil 39 in the electromagnet sufficiently to cause movement of the valve 18 under the action of the spring 41 to supply fluid pressure to the ram 13 and move the ram in a direction against the spring 27 to feed the tool into the work. It may be pointed out at this time that the control circuit is balanced in such a manner that the wattage through the load coil 39 in the electromagnet increases and decreases in proportion to the light intensity intercepted by the phototube S.

The control circuit, briefly described above, also embodies the second phototube 55 and the auxiliary amplifier 59, previously described as operating to withdraw the tool from the work in the event the current flowing through the amplifier 50 drops below a predetermined value. As shown in Figure 4, the anode 87 of the phototube 55 is electrically connected to the resistor 74 by the tap 81, and the cathode 88 is electrically connected to the grid 89 of the amplifier tube 59. The grid is also connected to one end of a resistor 74' having the opposite end connected to the resistor 74 by the tap 75' and, as a result, is connected in parallel with the phototube 55. The amplifier tube 59 is also provided with a cathode 90 electrically connected to the resistor 74 by means of the tap 91. The filament 92 of the amplifier tube is connected to the power pack 73 to receive low voltage alternating current from the latter, and the plate 93 of the tube is connected into the grids 69 of the tubes 64 through the resistance 78 in the output circuit of the tube 63.

With the above arrangement, it will be noted that under normal conditions, when no light is intercepted by the phototube 55, the grid 89 is at a negative potential with respect to the cathode 90, and the output or plate current of the tube 59 is zero. However, when the phototube 55 intercepts light passing through the aperture 53 in the microammeter 51, the potential of the grid 89 is increased and the current flows through the plate circuit of the amplifier tube 59. This current flows through the resistor 79 and counteracts the "C" battery current causing a voltage drop across the resistor. The point R' of the resistor 79 is positive with respect to the point $R^2$ and is of a value sufficient to nullify the normally fixed negative bias of the "C" battery. When this condition exists, the plates of the tubes 64 will draw sufficient current to energize the load coil 39, regardless of the fact that the plate of the tube 63 is drawing current through the resistor 78 and causing a drop across this resistor with a negative bias to the grids of the tubes 64. In other words, with the elimination of the fixed negative bias provided by the "C" battery, tubes 64 cannot be rendered non-conductive by the main amplifier.

Figure 9:
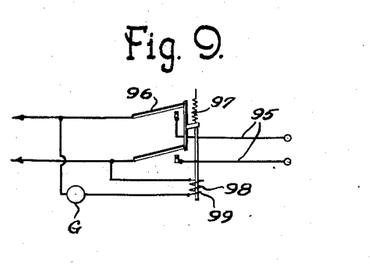
Figure 9 is a diagrammatic view illustrating a control circuit.

Provision has also been made herein for automatically discontinuing the operation of the machine in the event the source of illumination G in the projector should fail. In Figure 9 of the drawings, I have diagrammatically illustrated a circuit whereby the foregoing results may be accomplished. In this figure, the source of electrical energy for the machine, including the light bulb G, is designated by the reference character 95 and the circuit is adapted to be closed by a line switch 96 normally urged to its open position by means of a spring 97. The action of the spring 97 to open the switch is counteracted by an electromagnet 98 having a load coil 99 connected in series with the lamp G of the projector, with the result that the switch 96 is held closed by the electromagnet 98 when the bulb G in the projector E is operating satisfactorily. However, if this bulb should burn out, the load coil 99 of the electromagnet will be de-energized permitting the spring 97 to open the switch 96. This arrangement is of particular advantage in the present invention in that it prevents drilling of the work by the tool in the event the source of illumination in the bulb G in the projector E becomes inoperative.

What I claim as my invention is:

1. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward and away from each other, and means responsive to a drop in current below a predetermined value to effect operation of the last named means to relatively move the tool and work blank away from each other.

2. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward and away from each other, a second light sensitive cell rendered operative by a predetermined change in the value of electrical current flowing through the first light sensitive cell, and means controlled by the second light sensitive cell to relatively move the tool and work away from each other.

3. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward and away from each other, a second light sensitive cell, a meter for measuring the current flowing through the first light sensitive cell and responsive to a predetermined change in value of the current flowing through the first light sensitive cell to render the second light sensitive cell operative, and means controlled by the second light sensitive cell to effect relative movement of the tool and work blank away from each other.

4. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward each other when the intensity of light intercepted by the cell diminishes causing a drop in electrical current flowing through the cell and to relatively move the tool and work blank away from each other when the intensity of light intercepted by the cell increases, and means rendered operative by a drop in current below a predetermined value to counteract the light sensitive cell and effect relative movement of the tool and work away from each other.

5. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward each other when the intensity of light intercepted by the cell diminishes causing a drop in electrical current flowing through the cell and to relatively move the tool and work blank away from each other when the intensity of light intercepted by the cell increases, and a second light sensitive cell rendered operative by a predetermined drop in current flowing through the first cell to pass electrical current and effect an operation of the means aforesaid to relatively move the tool and work blank away from each other.

6. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward each other when the intensity of light intercepted by the cell diminishes causing a drop in electrical current flowing through the cell and to relatively move the tool and work blank away from each other when the intensity of light intercepted by the cell increases, a second light sensitive cell rendered operative by a predetermined drop in current flowing through the first cell to pass electrical current, and means responsive to the flow of current through the second light sensitive cell to oppose the action of the first named cell and operate the means aforesaid to relatively move the tool and work blank away from each other.

7. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank in one direction when the intensity of light intercepted by the cell diminishes causing a drop in electrical current flowing through the cell and to relatively move the tool and work blank in the opposite direction when the intensity of light intercepted by the cell increases to effect a corresponding increase in the current passing through the cell, and means rendered operative by a predetermined change in current flowing through the light sensitive cell to oppose the operation of the light sensitive cell and effect relative movement of the tool and work in a direction opposite the direction influenced by said light sensitive cell.

8. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank in one direction when the intensity of light intercepted by the cell diminishes causing a drop in electrical current flowing through the cell and to relatively move the tool and work blank in the opposite direction when the intensity of light intercepted by the cell increases to effect a corresponding increase in the current passing through the cell, and means rendered operative by a predetermined drop in current flowing through the light sensitive cell to oppose the operation of said cell and effect relative movement of the tool and work blank in said second named direction.

9. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward each other when the intensity of light intercepted by the cell diminishes causing a drop in electrical current flowing through the cell and to relatively move the tool and work blank away from each other when the intensity of light intercepted by the cell increases, a second light sensitive cell controlling said means, a meter for measuring the current flowing through the first light sensitive cell and responsive to a predetermined drop in current flowing through the first cell to render the second light sensitive cell operative to effect relative movement of the tool and work blank away from each other by said means.

10. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank in one direction when the intensity of light intercepted by the cell diminishes causing a drop in electrical current flowing through the cell and to relatively move the tool and work blank in the opposite direction when the intensity of light intercepted by the cell increases to effect a corresponding increase in the current passing through the cell, and means rendered operative by a predetermined change in current flowing through the light sensitive cell to oppose the operation of said cell and operate the means aforesaid to relatively move the tool and work blank in a direction opposite the direction influenced by the light sensitive cell.

11. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank in one direction when the intensity of light intercepted by the cell diminishes causing a drop in electrical current flowing through the cell and to relatively move the tool and work blank in the opposite direction when the intensity of light intercepted by the cell increases to effect a corresponding increase in the current passing through the cell, a second light sensitive cell, a meter for measuring the current flowing through the first light sensitive cell and responsive to a predetermined change in current flowing through the first cell to render the second light sensitive cell operative to effect relative movement of the tool and work blank in a direction opposite the direction influenced by the first light sensitive cell.

12. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank in one direction when the intensity of light intercepted by the cell diminishes causing a drop in electrical current flowing through the cell and to relatively move the tool and work blank in the opposite direction when the intensity of light intercepted by the cell increases to effect a corresponding increase in the current passing through the cell, a meter for measuring the value of the current flowing through the light sensitive cell and having an aperture therethrough, a source of illumination at one side of the meter to direct light through the aperture, a second light sensitive cell at the opposite side of the meter, means normally blocking the passage of light through the aperture including a member operated by the meter in response to the flow of current therethrough and effective upon a predetermined change in the value of the current to permit light from said source of illumination to pass through the aperture, and means controlled by the second light sensitive cell to oppose the action of the first cell and effect relative movement of the tool and work blank in a direction opposite the direction influenced by the first light sensitive cell.

13. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward each other when the intensity of light intercepted by the cell diminishes causing a drop in electrical current flowing through the cell and to relatively move the tool and work blank away from each other when the intensity of light intercepted by the cell increases, a meter for measuring the value of the current flowing through the light sensitive cell and having an aperture therethrough, a source of illumination at one side of the meter to direct light through the aperture, a second light sensitive cell at the opposite side of the meter, means normally blocking the passage of light through the aperture including a member operated by the meter in response to the flow of current therethrough and effective upon a predetermined drop in the value of current flowing through the first light sensitive cell to permit light from said source of illumination to pass through the aperture, and means controlled by the second light sensitive cell to oppose the action of the first cell and effect relative movement of the tool and work blank away from each other.

14. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, an amplifier electrically connected to the light sensitive cell to amplify the current flowing therethrough, an electrically operated device connected in the output circuit of the amplifier and controlled by the light sensitive cell to relatively move the tool and work blank in one direction when the intensity of light intercepted by the cell diminishes causing a drop in the value of current flowing in the output circuit of the amplifier and to relatively move the tool and work blank in the opposite direction when the intensity of light intercepted by the cell increases effecting a corresponding increase in the current flowing through the amplifier, and a second normally inoperative amplifier rendered operative by a predetermined change of current flowing through the first amplifier and connected in the first amplifier circuit to oppose the action of the latter under the influence of the light sensitive cell to effect an operation of the device aforesaid to relatively move the tool and work blank in a direction opposite the direction influenced by said light sensitive cell.

15. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, an amplifier electrically connected to the light sensitive cell to amplify the current flowing therethrough, an electrically operated device connected in the output circuit of the amplifier and controlled by the light sensitive cell to relatively move the tool and work blank in a direction toward each other when the intensity of light intercepted by the cell diminishes causing a drop in current flowing in the output circuit of the amplifier and to relatively move the tool and work blank in a direction away from each other when the intensity of light intercepted by the cell increases effecting a corresponding increase in the current flowing through the amplifier, a second light sensitive cell rendered operative by a predetermined drop in current flowing through the first cell, and a second amplifier connecting the second light sensitive cell in the first amplifier circuit in a manner to counteract the operation of the first amplifier under the influence of the first light sensitive cell to effect an operation of the device aforesaid to relatively move the tool and work blank away from each other.

16. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward and away from each other, and means rendered operative in the event of failure of the light casting means in the optical system to discontinue the operation of the apparatus.

17. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank in one direction when the intensity of light intercepted by the cell diminishes causing a drop in electrical current flowing through the cell and to relatively move the tool and work blank in the opposite direction when the intensity of light intercepted by the cell increases to effect a corresponding increase in the current passing through the cell, means rendered operative by a predetermined change in current flowing through the light sensitive cell to oppose the operation of the light sensitive cell and effect relative movement of the tool and work in a direction opposite the direction influenced by said light sensitive cell, and means rendered operative in the event of failure of the light casting means in the optical system to discontinue the operation of the apparatus.

18. In apparatus for reproducing a shaded record in a work blank, a tool supported opposite the work blank, an optical system for scanning the shaded record, said optical system having means for casting light on the shaded record and having a light sensitive cell responsive to variations in shading of the record to pass an electrical current of a value depending upon the intensity of light intercepted by the cell, means controlled by the light sensitive cell to relatively move the tool and work blank toward each other when the intensity of light intercepted by the cell diminishes causing a drop in electrical current flowing through the cell and to relatively move the tool and work blank away from each other when the intensity of light intercepted by the cell increases, means rendered operative by a drop in current below a predetermined value to counteract the light sensitive cell and effect relative movement of the tool and work away from each other, and means rendered operative in the event of failure of the light casting means in the optical system to discontinue the operation of the apparatus.

EVERETT J. COOK.